(12) United States Patent
Shaheen

(10) Patent No.: US 12,177,731 B2
(45) Date of Patent: Dec. 24, 2024

(54) METHOD AND APPARATUS FOR PERFORMING HANDOVER OF A MULTI-USIM RADIO-CAPABLE UE OVER SAME OR DIFFERENT SYSTEMS

(71) Applicant: SHARP KABUSHIKI KAISHA, Sakai (JP)

(72) Inventor: Kamel M. Shaheen, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 489 days.

(21) Appl. No.: 17/765,151

(22) PCT Filed: Sep. 25, 2020

(86) PCT No.: PCT/JP2020/036437
§ 371 (c)(1),
(2) Date: Mar. 30, 2022

(87) PCT Pub. No.: WO2021/065748
PCT Pub. Date: Apr. 8, 2021

(65) Prior Publication Data
US 2022/0361058 A1    Nov. 10, 2022

Related U.S. Application Data

(60) Provisional application No. 62/909,616, filed on Oct. 2, 2019.

(51) Int. Cl.
*H04W 36/00* (2009.01)
*H04W 36/06* (2009.01)
(Continued)

(52) U.S. Cl.
CPC ... *H04W 36/0058* (2018.08); *H04W 36/0061* (2013.01); *H04W 36/06* (2013.01);
(Continued)

(58) Field of Classification Search
CPC ............................................. H04W 36/00–385
See application file for complete search history.

(56) References Cited

U.S. PATENT DOCUMENTS 9,271,214 B1 *  2/2016  Yang .................... H04W 48/20
11,012,909 B2 *  5/2021  Ohta .................... H04W 36/087
(Continued)

OTHER PUBLICATIONS

"3rd Generation Partnership Project; Technical Specification Group Core Network and Terminals; Test specification for (U)SIM; Application Programming Interface (API) for Java Card™(Release 15)", 3GPP TS 31.213 V15.0.0(Jul. 2018).
(Continued)

*Primary Examiner* — Brendan Y Higa
(74) *Attorney, Agent, or Firm* — ScienBiziP, P.C.

(57) ABSTRACT

A user equipment (UE) for wireless communication is disclosed. The UE includes one or more non-transitory computer-readable media having computer-executable instructions embodied hereon, and at least one processor coupled to the one or more nontransitory computer-readable media, and configured to execute the computer-executable instructions to provide a measurement report to a source base station and receive a handover command through the source base station. The measurement report includes measurements of a target base station associated with a first universal subscriber identity module (USIM) of the UE. The handover command contains information of the target base station and information of at least one candidate target base station associated with a second USIM of the UE.

8 Claims, 9 Drawing Sheets

(51) Int. Cl.
*H04W 36/14* (2009.01)
*H04W 88/06* (2009.01)
*H04W 84/04* (2009.01)

(52) U.S. Cl.
CPC .......... *H04W 88/06* (2013.01); *H04W 36/144* (2023.05); *H04W 84/042* (2013.01)

(56) References Cited

U.S. PATENT DOCUMENTS

| | | |
|---|---|---|
| 2012/0021744 A1* | 1/2012 | Chin ................. H04W 36/08 455/436 |
| 2014/0079022 A1 | 3/2014 | Wang et al. |
| 2015/0312787 A1 | 10/2015 | Das et al. |
| 2017/0118669 A1* | 4/2017 | Qin ................. H04W 36/0066 |
| 2018/0049079 A1 | 2/2018 | Ozturk et al. |
| 2023/0026710 A1* | 1/2023 | Wang ................. H04W 36/14 |
| 2024/0107409 A1* | 3/2024 | Da Silva ........... H04W 36/0033 |

OTHER PUBLICATIONS

Intel, "New WID: Service Support for Multi-USIM devices", S1-190110, 3GPP TSG-SA WG1 Meeting #85, Tallin, Estonia, Feb. 18-22, 2019.

Ericsson, "Dual-SIM Dual-Standby UEs and their impact on the Ran", R2-115375, 3GPP TSG-RAN WG2 #75bis, Zhuhai, China Oct. 10-14, 2011.

* cited by examiner

METHOD AND APPARATUS FOR PERFORMING HANDOVER OF A MULTI-USIM RADIO-CAPABLE UE OVER SAME OR DIFFERENT SYSTEMS

TECHNICAL FIELD

The present disclosure generally relates to wireless communication, and more particularly, to a multiple-universal subscriber identity module (multi-USIM) based operations in a user equipment (UE) supporting the same or different operators.

BACKGROUND ART

In wireless communication systems, support for multi-USIM based operations in a UE is handled in an implementation-specific manner without any support from 3rd Generation Partnership Project (3GPP) specifications, resulting in a variety of implementations and UE behaviors. In a multi-USIM device, the USIMs typically share common radio and baseband components. Thus, the multi-USIM device may register in different networks but using one radio front-end (RF) and base band.

In the next generation (e.g., fifth generation (5G) new radio (NR) wireless communication networks, a multi-USIM UE is expected to be in Radio Resource Control (RRC) Connected state with only one network at a time, while being able to receive paging, perform signal measurements, or read system information, and determine if it needs to respond to paging requests from other networks. With a single RF plate-form, however, the UE must listen to paging of the other connection(s), and the network needs to be aware of the multi-registration scenario. When a UE is paged on a second system while connected to a first system, the paged UE may drop the connection on the first system and attempt to access the second system without releasing the first connection due to lack of time to switch systems. Such behaviors can cause performance degradations and reductions in overall system capacity.

On the network end, the current network systems remain ignorant of the UEs' capability to support multi-USIM based operations. In order to support multi-USIM UEs, the network systems need to be aware of such capabilities in order to coordinate the operations of multi-USIM registrations, potential simultaneous operations and collision avoidance.

Moreover, as the UEs support multi-USIM based operations, a handover procedure, which is an event in which a network transfers an ongoing data session with one USIM from a source base station to a target base station, needs to take into consideration of the multi-USIM based operations.

Thus, there is a need in the art for apparatus and methods to perform handovers between different systems associated with a multi-USIM based operation UE.

SUMMARY OF INVENTION

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: provide a measurement report to a source base station, the measurement report including measurements of a target base station associated with a first universal subscriber identity module (USIM) of the UE; receive a handover command through the source base station, the handover command containing information of the target base station, the handover command further containing information of at least one candidate target base station associated with a second USIM of the UE.

In one example, a method of a user equipment (UE), the method comprising providing a measurement report to a source base station, the measurement report including measurements of a target base station associated with a first universal subscriber identity module (USIM) of the UE; receiving a handover command through the source base station, the handover command containing information of the target base station, the handover command further containing information of at least one candidate target base station associated with a second USIM of the UE.

In one example, a method for performing handover of a user equipment (UE) from a source base station to a target base station, the method comprising: providing, by the UE, a measurement report to the source base station, the measurement report including measurements of the target base station; providing, by the source base station, a handover request message to the target base station; providing, by the target base station, a handover request acknowledgement message to the source base station, the handover request acknowledgement message having a handover command; providing, by the source base station, the handover command to the UE; wherein the handover command contains information of the target base station associated with a first universal subscriber identity module (USIM) of the UE, and information of at least one candidate target base station associated with a second USIM of the UE.

BRIEF DESCRIPTION OF DRAWINGS

Implementations of the present technology will now be described, by way of example only, with reference to the attached figures.

DESCRIPTION OF EMBODIMENTS

Figure 1:
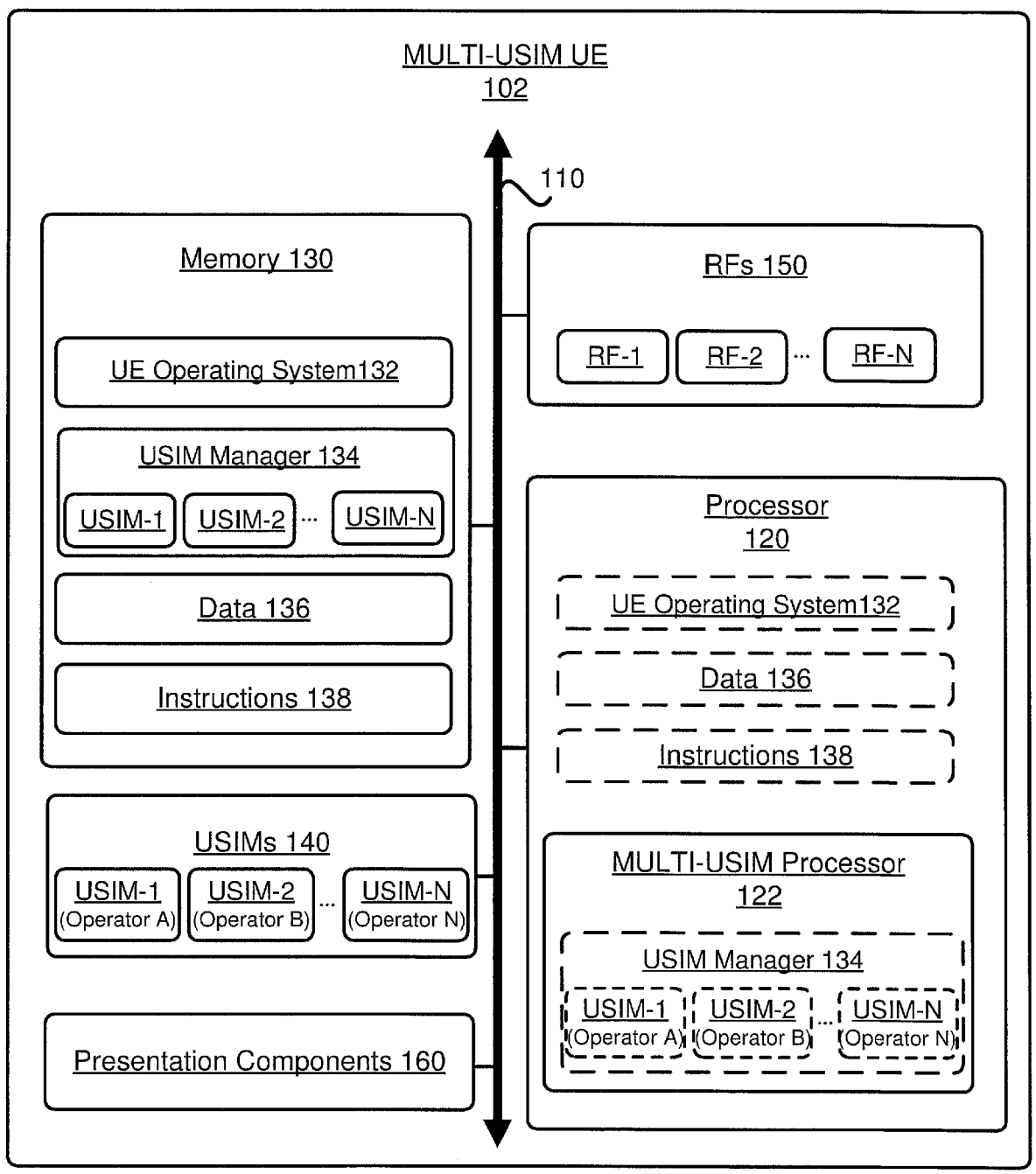
FIG. 1 is a block diagram of a multi-USIM UE supporting the same or different operators, in accordance with various example implementations of the present disclosure.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In de-scribing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and mMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by the same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram of a multi-USIM UE supporting the same or different operators, in accordance with various example implementations of the present disclosure. As shown in FIG. 1, multi-USIM UE 102 may include processor 120, memory 130, multiple USIMs 140 belonging to different networks/operators, multiple Radio Front-end circuitries (RFs) 150, and one or more presentation components 160. Multi-USIM UE 102 may also include one or more radio frequency spectrum band modules, one or more base station communications modules, one or more network communications modules, and one or more system communications management modules, Input/Output (I/O) ports, I/O components, and power supply (not explicitly shown in FIG. 1). Each of these components may be in communication with each other, directly or indirectly, over one or more buses 110.

In various implementations of the present disclosure, processor 120 (e.g., having processing circuitry) may include an intelligent hardware device, e.g., a Central Processing Unit (CPU), a microcontroller, an ASIC, and etc. Processor 120 may also include memory storage. As illustrated in FIG. 1, processor 120 may be responsible for running UE operating system 132, and processing data 136 and instructions 138 received from memory 130, information through RFs 150, the base band communications module, and/or the network communications module. Processor 120 may also process information to be sent to RFs 150 for transmission to the network communications module for transmission to a core network. In the present implementation, processor 120 may include multi-USIM processor 122 for processing instructions from USIM manager 134 for one or more of USIMs of multi-USIM UE 102, for example.

As illustrated in FIG. 1, memory 130 may store UE operating system 132, USIM manager 134, data 136, and computer-readable, computer-executable instructions 138 (e.g., software codes) that are configured to, when executed, cause processor 120 to perform various functions described herein. Alternatively, USIM manager 134 and/or instructions 138 may not be directly executable by processor 120 but be configured to cause multi-USIM UE 102 (e.g., when compiled and executed) to perform various functions described herein.

In various implementation of the present disclosure, memory 130 may include a variety of computer-readable media. Computer-readable media may be any available media that may be accessed by multi-USIM UE 102 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various implementation of the present disclosure, memory 130 may include computer-storage media in the form of volatile and/or non-volatile memory. Memory 130 may be removable, non-removable, or a combination thereof. Example memory includes solid-state memory, hard drives, optical-disc drives, and etc.

As illustrated in FIG. 1, multi-USIM UE 102 may include multiple USIMs 140, such as USIM-1, USIM-2, through USIM-N. USIM-1, USIM-2, through USIM-N may belong to the same or different network/operator (e.g., Public Land Mobile Network (PLMN)). For example, USIM-1, USIM-2, through USIM-N may belong to Operator A, Operator B, through Operator N, respectively. It should be noted that, although USIMs are described in the present implementation and various implementations of the present disclosure, other subscriber identity modules or subscriber identification modules (e.g., SIMs) can also be used.

As shown in FIG. 1, multi-USIM UE 102 may include multiple RFs 150, such as RF-1, RF-2, through RF-N. Each of the RFs 150 may include a transmitter (e.g., transmitting/transmission circuitry) and a receiver (e.g., receiving/reception circuitry). In some implementations of present disclosure, RF-1, RF-2, through RF-N of RFs 150 may respectively correspond to USIM-1, USIM-2, through USIM-N, where USIM-1, USIM-2, through USIM-N may transmit and/or receive data and control channels, for example, through RF-1, RF-2, through RF-N, respectively.

As shown in FIG. 1, multi-USIM UE 102 may include presentation components 160 for presenting data indications to a person or other device. Examples of presentation components 160 may include a display device, speaker, printing component, vibrating component, etc.

Figure 2:
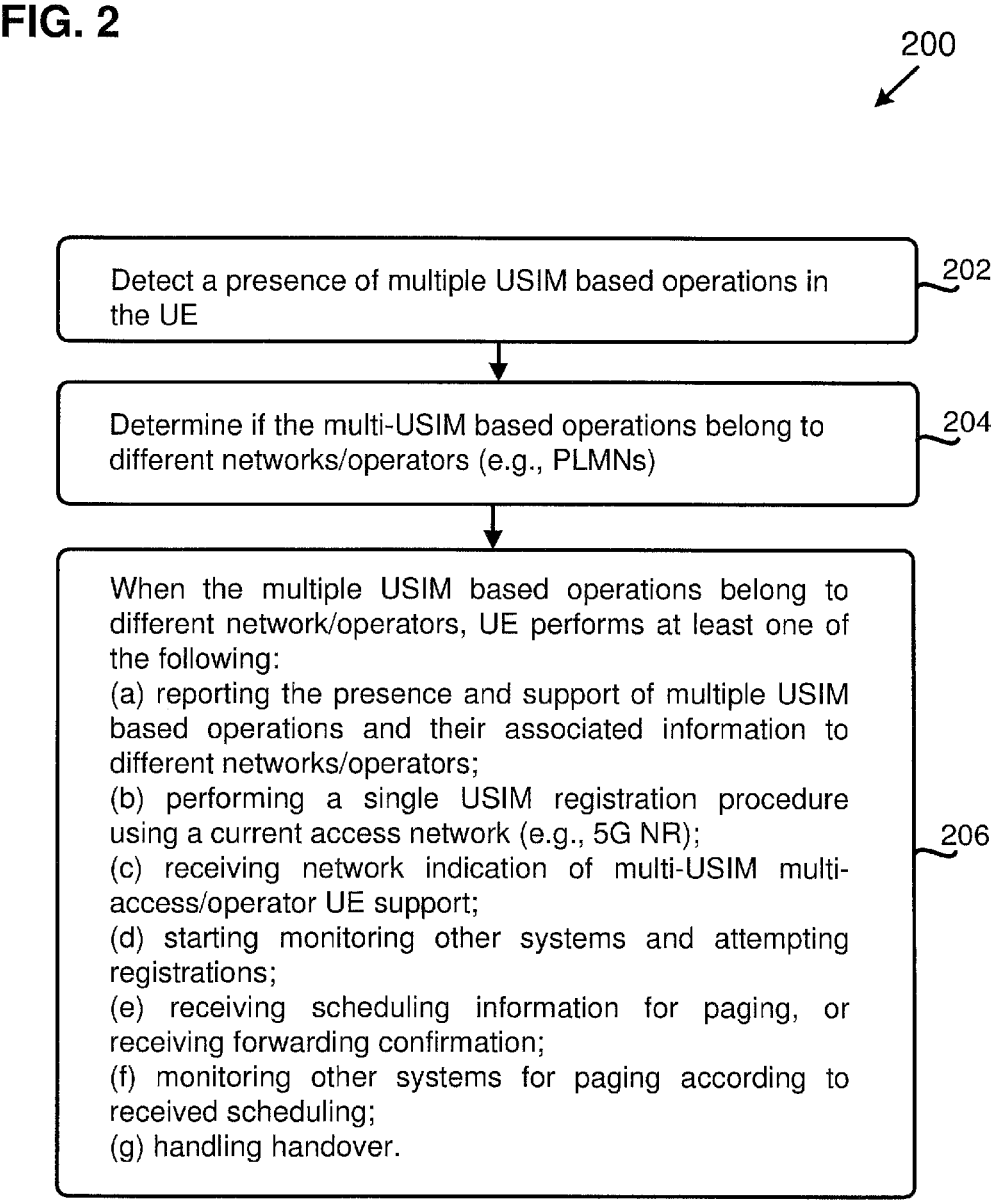
FIG. 2 is a flowchart diagram illustrating a method of a UE for performing multi-USIM registrations in different communication networks, in accordance with example implementations of the present disclosure.

FIG. 2 is a flowchart diagram illustrating a method of a UE for performing multi-USIM registrations in different communication networks, in accordance with example implementations of the present disclosure. As illustrated in FIG. 2, flowchart 200 may include actions 202, 204, 206. In one implementation, the UE described in flowchart 200 may correspond to multi-USIM UE 102 in FIG. 1.

In action 202, the UE may detect a presence of multiple USIM based operations in the UE. In one implementation, before the UE is powered on, two or more USIMs are inserted into the USIM card slots of the UE, for example. When the UE is powered on, the UE (e.g., through multi-USIM processor 122 and USIM manager 134 in FIG. 1) may detect the presence of the multiple USIM based operations. In another implementation, the UE is initially powered on with a first USIM based operation, and a second USIM based operation is later inserted into the UE. The UE (e.g., through multi-USIM processor 122 and USIM manager 134 in FIG. 1) may detect the second USIM based operation while the UE is operating with the first USIM based operation already registered with the current network.

In action 204, the UE may determine if the multi-USIM based operations belong to different networks/operators. In one implementation, the UE may check the operator IDs (e.g., PLMN IDs) associated with the USIM based operations in the UE to determine if the multi-USIM based operations belong to different networks/operators. For example, when the PLUM IDs of the USIM based operations are different, then the multiple USIM based operations belong to different networks/operators.

In action 206, when the multi-USIM based operations belong to different networks/operators, the UE may report the presence and support of multi-USIM based operations and their associated information to the networks/operators. The UE may perform a single USIM registration procedure using a current (or preferred) access network (e.g., 5G NR). The UE may receive a network indication of multi-USIM and multi-access/operator (e.g., PLMN) UE support. The UE may start monitor other systems and attempt registrations. The UE may receive scheduling information for paging or receiving forwarding confirmation. The UE may also monitor other systems for paging according to received scheduling. The UE may also handle handover procedure(s).

Figure 3:
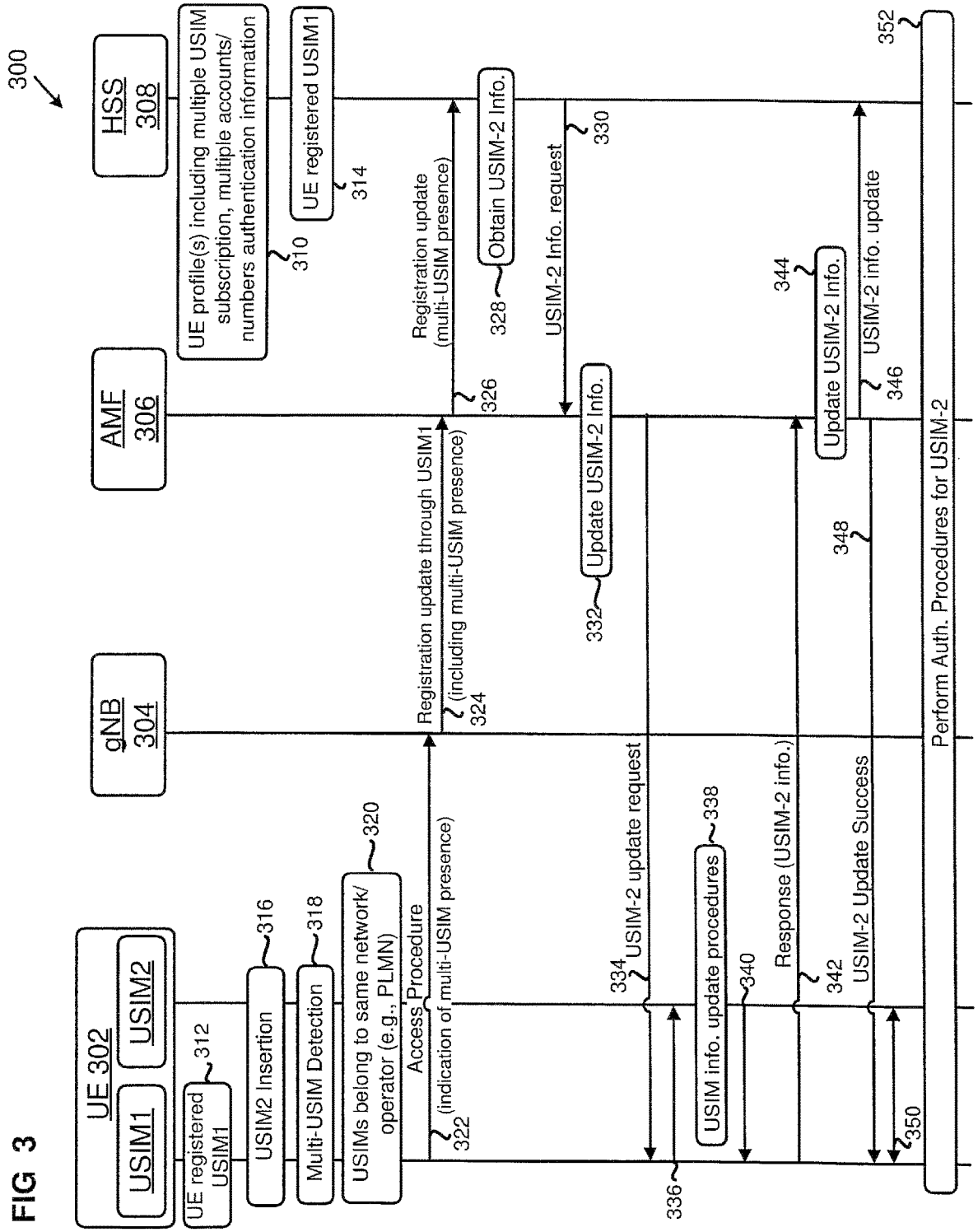
FIG. 3 is a signaling sequence diagram for schematically illustrating a method of reporting a multi-USIM presence in a UE and capabilities of the multiple USIMs to a wireless communication network through an access registration procedure, in accordance with example implementations of the present disclosure.

FIG. 3 is a signaling sequence diagram for schematically illustrating a method of reporting a multi-USIM presence in a UE and capabilities of the multiple USIMs to a wireless communication network through an access registration procedure, in accordance with example implementations of the present disclosure.

As shown in FIG. 3, in diagram 300, UE 302 may report or register the presence and capabilities of multi-USIM based operations associated with each USIM to Home Subscriber Server (HSS) 308 through next generation NodeB (gNB) 304 and Access and Mobility Management Function (AMF) 306, for example, through one or more of actions 310, 312, 314, 316, 318, 320, 322, 324, 326, 328, 330, 332, 334, 336, 338, 340, 342, 344, 346, 348, 350, 352, and 354. In one implementation, UE 302 described in diagram 300 may correspond to multi-USIM UE 102 in FIG. 1. It should be noted that, in diagram 300, although UE 302 is shown to include two USIM based operations (USIM1 and USIM2 based operations), UE 302 may include and support more than two USIM based operations.

In action 310, HSS 308 may store UE profiles including multi-USIM subscriptions, multiple accounts/numbers authentication information for one or more UEs.

In action 312, USIM1 of UE 302's registration and authentication are successful. For example, the Attach is complete for USIM1.

In action 314, in HSS 308, USIM1 of UE 302 is registered and authenticated.

In action 316, USIM2 may be inserted into UE 302.

In action 318, UE 302 may detect a presence of multiple USIMs. For example, UE 302 (e.g., through multi-USIM processor 122 and USIM manager 134 in FIG. 1) may detect USIM2 while UE 302 is operating with USIM1 that is already registered with the network (e.g., AMF 306 and HSS 308). Thus, when USIM2 is inserted, UE 302 may detect the presence of both USIM1 and USIM2.

In action 320, UE 302 may determine if USIM1 and USIM2 belong to the same network/operator. In one implementation, UE 302 may check the operator IDs (e.g., PLMN IDs) associated with USIM1 and USIM2 to determine if the operator IDs are the same. For example, each operator ID may include a mobile country code (MCC) and a mobile network code (MNC). When the MCC and MNC of USIM1 match those of USIM2, then UE 302 determines that USIM1 and USIM2 belong to the same network/operator. UE 302 may also determine if USIM 1 and USIM2 belong to different networks/operators. For example, when the MCC and MNC of USIM1 are different from those of USIM2, then UE 302 determines that USIM1 and USIM2 belong to different networks/operators.

In action 322, UE 302 may initiate an access procedure with gNB 304 using USIM1. In the access procedure, UE 302 may send a message to gNB 304 using USIM1, the associated RF circuitry (e.g., RF1 in FIG. 1), and the current access network system of USIM1. The message may include an indication indicating the presence of USIM1 and USIM2 in UE 302, and USIM2 related information (e.g., phone number, IMSI, IMEI, TMSI, etc.). The message may also include updated capabilities of USIM1.

In action 324, gNB 304 may send the message having the multi-USIM presence of USIM1 and USIM2 to AMF 306 through a registration update procedure.

In action 326, AMF 306 may send the message having the multi-USIM presence of USIM1 and USIM2 to HSS 308 through the registration update procedure.

In action 328, HSS 308 may obtain information of USIM 2.

In action 330, HSS 308 may send a message to AMF 306 to request for USIM-2's information, such as associated capabilities (e.g., NAS and/or AS capabilities) of USIM2 for multi-USIM based operations.

In action 332, AMF 306 may imitate a USIM-2 information update.

In action 334, AMF 306 may send a USIM-2 update request to USIM1 of UE 302.

In action 336, a USIM manager (e.g., USIM manager 134 in FIG. 1) of UE 302 may convey the USIM 2 update request from USIM 1 to USIM 2, for example, through tunneling.

In action 338, USIM 2 may perform USIM 2 information update procedures, to respond to the update request.

In action 340, the USIM manager (e.g., USIM manager 134 in FIG. 1) of UE 302 may convey the associated capabilities (e.g., NAS and/or AS capabilities) of USIM 2 from USIM 2 to USIM 1, for example, through tunneling.

In action 342, UE 302, through USIM 1, may provide a USIM-2 update response having USIM 2's information to AMF 306.

In action 344, AMF 306 may update USIM 2's information.

In action 346, AMF 306 may provide the updated USIM 2's information to HSS 308.

In action 348, AMF 306 may send a USIM 2 update success message to UE 302 through USIM 1. Also, AMF 306 may send an authentication request for USIM2 to USIM1 of UE 302. The authentication request may be received by UE 302 through USIM1 and the RF circuitry associated with USIM1 (e.g., RF1 in FIG. 1). The authentication request may include the RAND and the AUTN which it received from HSS 308.

In action 350, a USIM manager (e.g., USIM manager 134 in FIG. 1) of UE 302 may convey the authentication request from USIM1 to USIM2, for example, through tunneling.

In action 352, the authentication procedures for USIM 2 may be performed. For example, a USIM processor (e.g., multi-USIM processor 122 in FIG. 1) of UE 302 may process the authentication request, using the RAND it received and its pre-shared secret key to generate authentication parameters through authentication calculation. USIM2 may send an authentication response of USIM2, including a Response (RES), back to USIM1. USIM1 may send the authentication response of USIM2 back to AMF 306 through USIM1 and the RF associated with USIM1. If the RES of USIM2 from UE 302 matches the XRES AMF 306 received from HSS 308, then USIM2 is authenticated successfully. AMF 306 may send a USIM2 authentication success message to HSS 308. AMF 306 may send a registration and authentication success message to USIM1 through the associated RF circuitry (e.g., RF1 in FIG. 1) of USIM1. The USIM manager (e.g., USIM manager 134 in FIG. 1) of UE 302 may convey the registration and authentication success message from USIM1 to USIM2, for example, through tunneling. USIM2 of UE 302's registration and authentication are successful. For example, the Attach is complete for USIM2. For example, AMF 306 may start managing USIM2 of UE 302.

Figure 4:
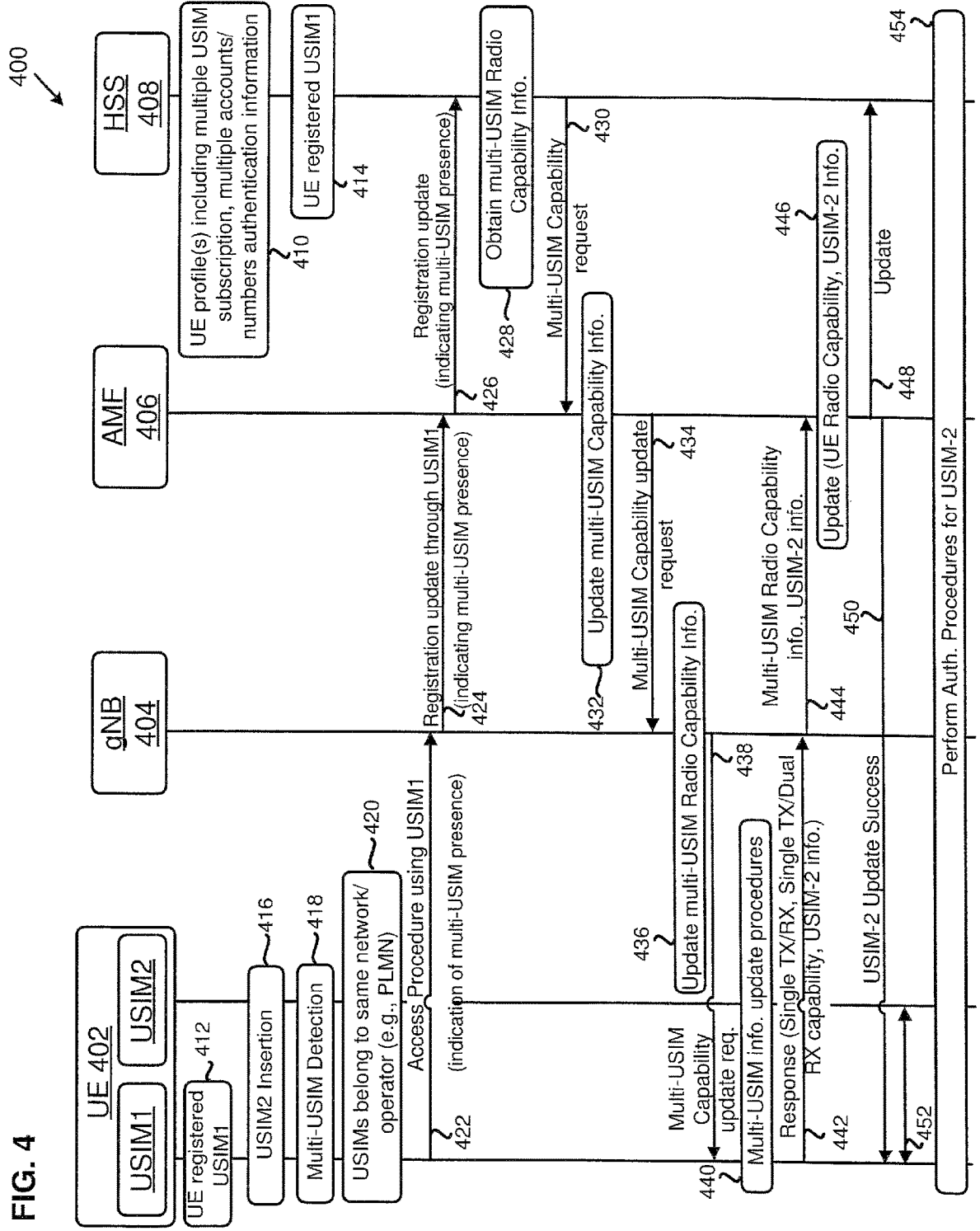
FIG. 4 is a signaling sequence diagram for schematically illustrating a method of reporting a multi-USIM presence in a UE and updating the UE's radio capabilities of multi-USIM based operations to a wireless communication network, in accordance with example implementations of the present disclosure.

FIG. 4 is a signaling sequence diagram for schematically illustrating a method of reporting a multi-USIM presence in a UE and updating the UE's radio capabilities of multi-USIM based operations to a wireless communication network, in accordance with example implementations of the present disclosure.

As shown in FIG. 4, in diagram 400, UE 402 may report or register the presence and capabilities of multi-USIM based operations associated with each USIM to Home Subscriber Server (HSS) 408 through next generation NodeB (gNB) 404 and Access and Mobility Management Function (AMF) 406, for example, through one or more of actions 410, 412, 414, 416, 418, 420, 422, 424, 426, 428, 430, 432, 434, 436, 438, 440, 442, 444, 446, 448, 450, 452, 454, and 456. In one implementation, UE 402 described in diagram 400 may correspond to multi-USIM UE 102 in FIG. 1. It should be noted that, in diagram 400, although UE 402 is shown to include two USIM based operations (USIM1 and USIM2 based operations), UE 402 may include and support more than two USIM based operations.

In the present implementation, actions 410, 412, 414, 416, 418, 420, 422, 424, and 426 may be substantially similar to actions 310, 312, 314, 316, 318, 320, 322, 324, and 326 in FIG. 3. Thus, the descriptions of actions 410, 412, 414, 416, 418, 420, 422, 424, and 426 are omitted for brevity.

In action 428, after HSS 408 receives the message having the multi-USIM presence from AMF 406, HSS 408 may initiate a procedure to obtain multi-USIM radio capability information, which may include information regarding USIM-2's capabilities and UE 402's radio capabilities for multi-USIM based operations.

In action 430, HSS 408 may send a multi-USIM Capability Request (REQ) to AMF 406.

In action 432, AMF 406 may also initiate a multi-USIM capability information update procedure for UE 402.

In action 434, AMF 406 may send a multi-USIM capability update request to gNB 404.

In action 436, gNB 404 may initiate a multi-USIM radio capability information update procedure for UE 402.

In action 438, gNB 404 may send a request to USIM1 of UE 402 to request for USIM-2 capabilities and UE 402's radio capabilities for multi-USIM based operations.

In action 440, a USIM processor (e.g., multi-USIM processor 122 in FIG. 1) of UE 402 may perform multi-USIM information update procedures based on the multi-USIM capability update request.

In action 442, USIM1 may send a multi-USIM UE Radio Capability Update Response (RES) to gNB 404. The multi-USIM UE Radio Capability Update Response may include USIM-2 capabilities and UE 402's radio capabilities for multi-USIM based operations. For example, the multi-USIM UE Radio Capability Update Response may include UE's capabilities to support USIM 2, multi-USIM UE Transmit/Receive Radio Capabilities, simultaneous radio capabilities associated with multi-USIM based operations, radio bands associated with the multi-USIM based operations, information indicating whether the second USIM belongs to the same PLMN as the first USIM and indicating one or more operators associated with the multi-USIM based operations, one or more Radio Access Technologies (RATs) associated with the multi-USIM based operations, and a network preference/priority list associated with the multi-USIM based operations.

The multi-USIM UE Transmit/Receive Radio Capabilities, simultaneous radio capabilities associated with the multi-USIM based operations may include, for example, at least one of the following: a single transmit and single receive configuration, a single transmit and double receive configuration, a double transmit and single receive configuration, and a double transmit and double receive configuration. The transmit and receive configuration above may be realized by, for example, at least one transmitter and at least one receiver. For example, a single transmit and double receive configuration may be realized by one transmitter and two receivers. The one or more RATs associated with the multi-USIM based operations may, for example, include at least one of the following: Code-Division Multiple Access (CDMA) 2000, GSM EDGE Radio Access Network (GERAN), Universal Terrestrial Radio Access (UTRA), Evolved-Universal Terrestrial Radio Access (E-UTRA), and New Radio (NR).

In action 444, gNB 404 may send the Response, including USIM-2 capabilities and UE 402's radio capabilities for multi-USIM based operations, to AMF 406.

In action 446, AMF 406 may update the multi-USIM capability information of UE 402.

In action 448, AMF 406 may send the USIM-2 capabilities and UE 402's radio capabilities for multi-USIM based operations to HSS 408.

In the present implementation, actions 450, 452 and 454 may be substantially similar to actions 348, 350, and 352 in FIG. 3. Thus, the descriptions of actions 450, 452 and 454 are omitted for brevity.

Figure 5:
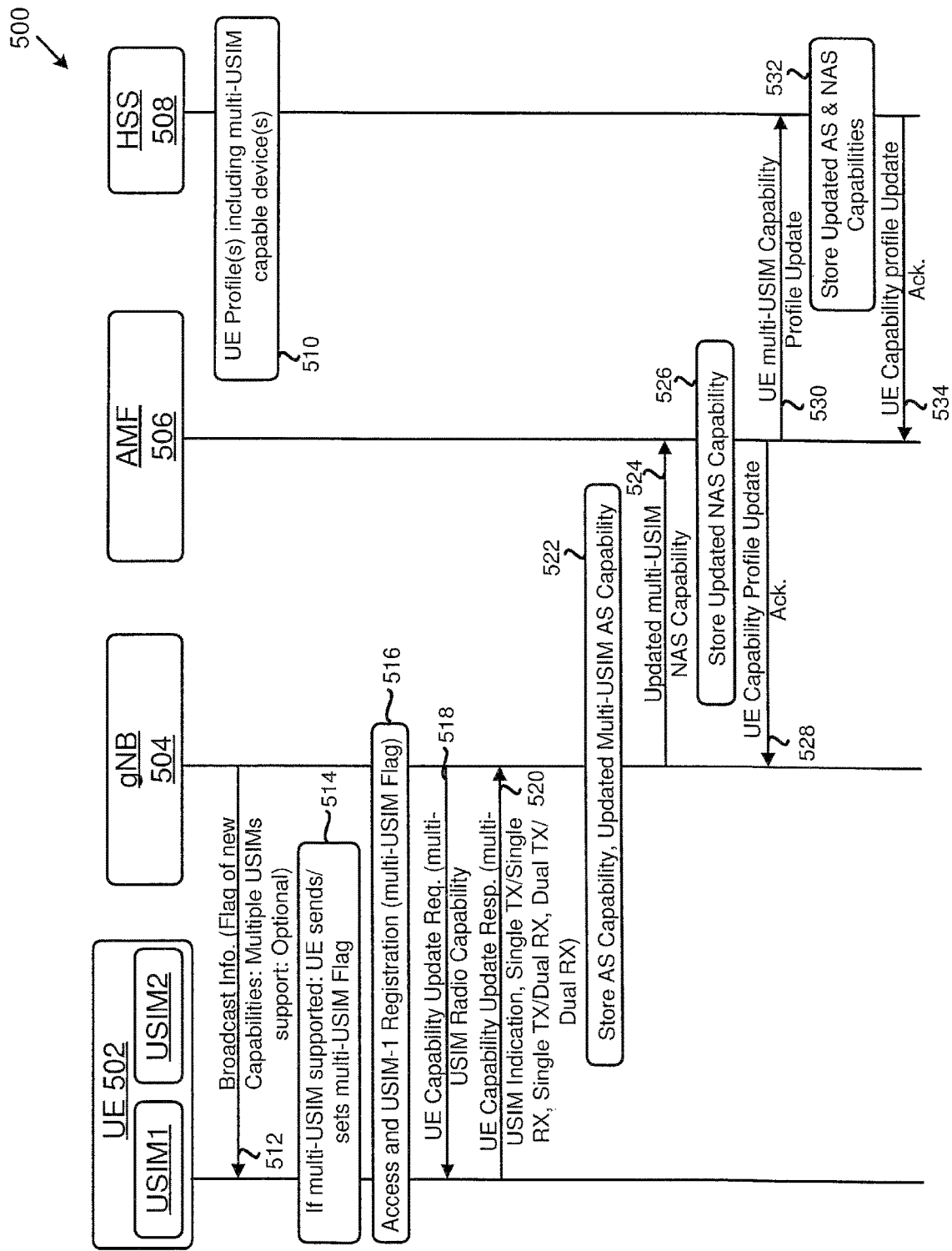
FIG. 5 is a signaling sequence diagram for schematically illustrating a method of broadcasting a broadcast message indicating multi-USIM support by a base station and updating a UE's radio capabilities of multi-USIM based operations, in accordance with example implementations of the present disclosure.

FIG. 5 is a signaling sequence diagram for schematically illustrating a method of broadcasting a broadcast message indicating multi-USIM support by a base station and updating a UE's radio capabilities of multi-USIM based operations, in accordance with example implementations of the present disclosure.

In the present implementation, diagram 500 may include actions 510, 512, 514, 516, 518, 520, 522, 524, 526, 528, 530, 532, and 534. In one implementation, UE 502 described in diagram 500 may correspond to multi-USIM UE 102 in FIG. 1 and/or multi-USIM UEs 302 and 402 in FIGS. 3 and 4.

In action 510, HSS 508 may store one or more UE profiles, which may include one or more multi-USIM capable devices.

In action 512, gNB 504 may broadcast information regarding whether gNB 504 supports multi-USIM based operations. For example, gNB 504 may broadcast through a Master Information Block (MIB) or a System Information Block (SIB), a message having a flag indicating whether gNB 504 supports multi-USIM based operations. Also, gNB 504 may broadcast the capabilities of gNB 504 associated with multi-USIM based operations.

UE 502 may receive a broadcast message from gNB 504, for example, through USIM1.

In action 514, UE 502 may send or set an indication (e.g., a flag) indicating that UE 502 supports multi-USIM based operations.

In action 516, UE 502 may perform an access and registration procedure for USIM1 based on the broadcast message, and report a presence and support of multi-USIM based operations to gNB 504 when the broadcast message in action 512 indicates that gNB 504 supports the multi-USIM based operations, or the multi-USIM based operations are active. During the access and registration procedure for USIM1, UE 502 may also include an indication (or a flag) indicating to gNB 504 that UE 502 supports multi-USIM based operations.

In action 516, when the broadcast message indicates that gNB 504 does not support the multi-USIM based operations, or the multi-USIM based operations are not active, UE 502 may only perform a registration procedure for USIM1 without indicating UE 502's multi-USIM capabilities.

In action 518, upon receiving UE 502's indication of multi-USIM based operation support, gNB 504 may send UE 502 a multi-USIM radio capability update request (REQ) to update radio capabilities of multi-USIM based operations. UE 502 may receive the REQ, from gNB 504, to update UE 502's radio capabilities of multi-USIM based operations.

In action 520, the UE may be configured to send a multi-USIM UE Radio capability update response (RES) to the base station. For example, UE 502 may send the RES to gNB 504 to update UE 502's radio capabilities of multi-USIM based operations.

In action 522, gNB 504 may store UE 502's AS capabilities and update multi-USIM AS capabilities of UE 502.

In action 524, gNB 504 may send a message to AMF 506 to update the multi-USIM NAS capabilities.

In action 526, AMF 506 may store the updated NAS capabilities with multi-USIM based operation capabilities of UE 502.

In action 528, AMF 506 may send a UE Capability Profile Update Acknowledgement to gNB 504.

In action 530, AMF 506 may send a message to HSS 508 to update UE 502's multi-USIM capability profile.

In action 532, HSS 508 may update and store the updated AS and NAS capabilities of UE 502.

In action 534, HSS 508 may send a UE Capability Profile Update Acknowledgement to AMF 506.

Figure 6:
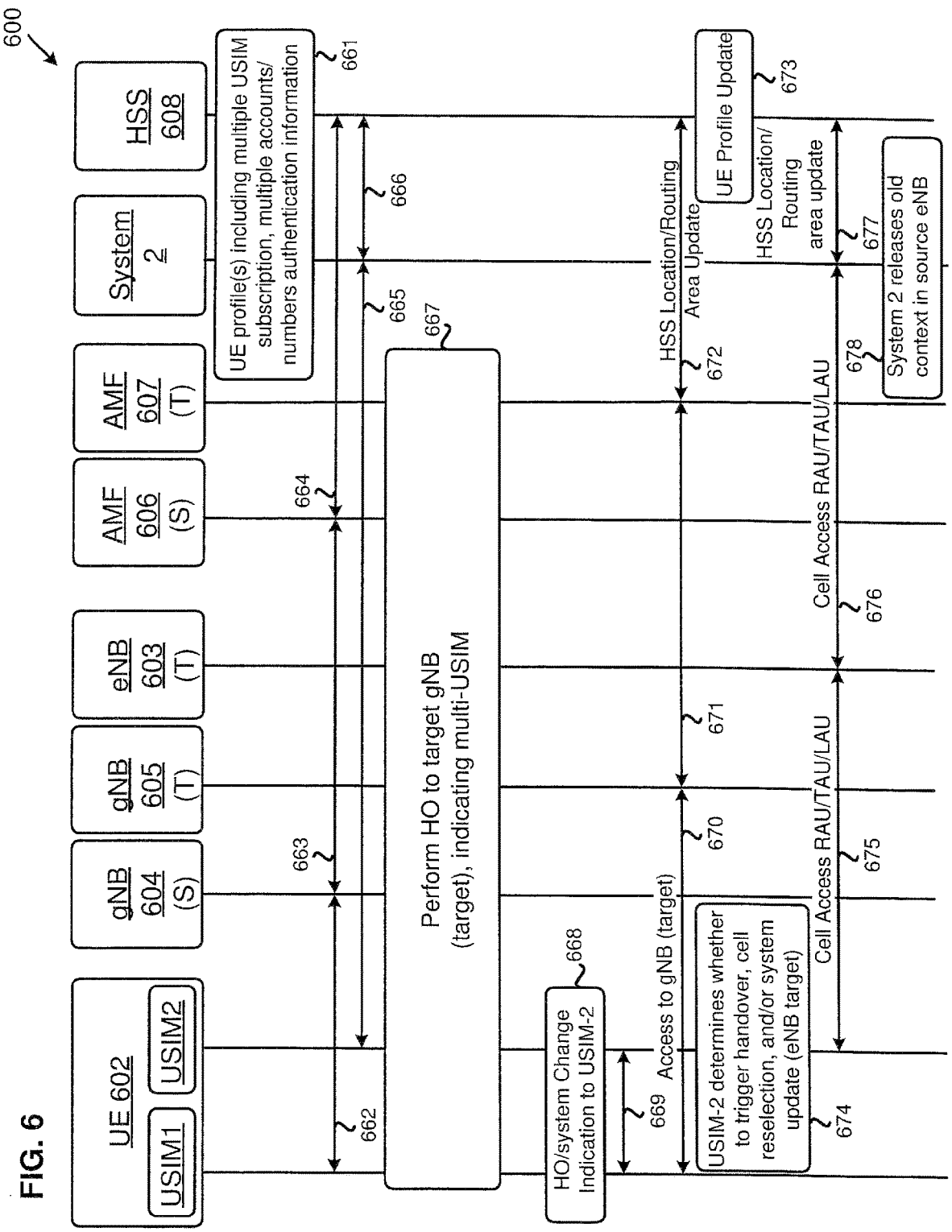
FIG. 6 is a signaling sequence diagram for schematically illustrating a method of performing a handover procedure for a first system associated with a first USIM of a multi-USIM UE and a second system associated with a second USIM of the multi-USIM UE, in accordance with example implementations of the present disclosure.

FIG. 6 is a signaling sequence diagram for schematically illustrating a method of performing a handover procedure for a first system associated with a first USIM and a second system associated with a second USIM of a multi-USIM UE, in accordance with example implementations of the present disclosure.

In diagram 600, a handover procedure in a wireless communication network may be performed for a first system (e.g., System 1) and a second system (e.g., System 2), where the first and the second systems may include different Radio Access Technologies (RATs), e.g., 5G, LTE, edge, etc. In the present implementation, multiple base stations (e.g., gNBs) and access and mobility management function nodes (e.g., AMFs) may be part of System 1 associated with a first USIM (e.g., USIM1) of UE 602. System 2 associated with second USIM (e.g., USIM2) of UE 602 may also include bases stations (e.g., eNB 603) and AMFs not explicitly shown. In the present implementation, USIM1 and USIM2 of UE 602 may belong to the same or different PLMNs. In the present implementation, System 1 may include, for example, source base station (e.g., gNB) 604, target base station (e.g., gNB) 605, source AMF 606, target AMF 607, and Home Subscriber Server (HSS) 608. System 2 may include includes base stations (e.g., target base station 603), AMFs, HSSs, and other network entities. In the present implementation, target base station 605 associated with USIM1 of UE 602 may support one or more of the following Radio Access Technologies: CDMA, GERAN, UTRA, E-UTRA, and NR.

In the present implementation, diagram 600 may include actions 661, 662, 663, 664, 665, 666, 667, 668, 669, 670, 671, 672, 673, 674, 675, 676, 677, and 678. In one implementation, UE 602 described in diagram 600 may correspond to multi-USIM UE 102 in FIG. 1 and/or multi-USIM UEs 302, 402, and 502 in FIGS. 3, 4, and 5, respectively.

In action 661, HSS 608 may store one or more UE profiles, which may include one or more multi-USIM capable devices or multiple USIM subscription, and multiple accounts/numbers authentication information.

In action 662, source base station 604 and USIM1 of UE 602 may have an established RRC connection. In the present implementation, source base station 604 may be in active data communication with USIM1 of UE 602 through the established a Radio Resource Control (RRC) connection.

In action 663, source base station 604 may exchange or relay data in the active data transmission between USIM1 and source base station 604 with source AMF 606. Source base station 604 may also exchange or relay system information with source AMF 606.

In action 664, source AMF 606 may further exchange or relay data in the active data transmission between USIM1 and source base station 604 with HSS 608. Source AMF 606 may further exchange or relay system information with HSS 608.

In action 665, USIM2 of UE 602 and System 2 may determine whether USIM2 of UE 602 is in data connectivity with System 2. For example, when USIM1 of UE 602 is active data communication with source base station 604, USIM2 of UE 602 may be in an RRC Inactive state or an RRC Idle state with System 2.

In action 666, System 2 may maintain a connection with HSS 608, while USIM2 of UE 602 is in the RRC Inactive or Idle state.

In action 667, source base station 604 may perform a handover procedure to transfer an ongoing data session with USIM1 of UE 602 to target base station 605. For example, source base station 604 may make a handover decision on whether to handover USIM1 of UE 602 to target base station 605, based on a measurement report from UE 602. The measurement report may include measurements of target base station 605 associated with USIM1 of UE 602. For example, if source base station 604 determines that Quality of Service (QoS) for UE 602 is poor in System 1 based on the measurement report, source base station 604 may perform a handover process to target base station 605. The handover process may include USIM1 of UE 602 receiving a handover command, which contains information of target base station 605 and at least one candidate target base station (e.g., target base station 603) associated with USIM2 of UE 602. In the present implementation, target base station 603 associated with USIM2 of UE 602 may support one or more of the following Radio Access Technologies: CDMA, GERAN, UTRA, E-UTRA, NR, etc.

Moreover, USIM1 of UE 602 may indicate multi-USIM support of UE 602 (e.g., support USIM2) to target base station 605. Source AMF 606 and target AMF 607 may be updated as a result of the handover process between source base station 604 and target base station 605 of System 1.

In action 668, USIM1 of UE 602 may indicate to USIM2 of UE 602 the performed handover associated with USIM1 between source base station 604 and target base station 605 in System 1.

In action 669, after USIM1 of UE 602 receives the handover command, the handover command may trigger USIM1 of UE 602 to send a handover indication to USIM2 of UE 602. The handover indication may inform USIM2 of UE 602 of the impeding mobility of USIM2 of UE 602. The handover indication may also include additional information regarding the at least one candidate target base station (e.g., target base station 603) associated with USIM2 of UE 602. In the present implementation, the additional information may include measurement information of at least one of a list target cells and the corresponding threshold information. In one implementation, actions 668 and 669 may be performed after actions 670-673 and before action 674.

In action 670, the ongoing data session between source bastion station 604 is handover to target base station 605 without interruption. In action 670, USIM of UE 602 may also send information to target base station 605 to allow target base station 605 to perform at least one of routing area update (RAU), tracking area update (TAU), and location area update (LAU) with target AMF 607.

In action 671, target base station 605 may send a request for at least one of routing area update (RAU), tracking area update (TAU), and location area update (LAU) to target AMF 607.

In action 672, target AMF 607 may forward information in the request (in action 671) to HSS 608. HSS 608 may perform HSS location/routing area update based on the information provided by target AMF 607. HSS 608 may also send an HSS LAU response or an HSS RAU response to USIM1 of UE 602 via target AMF 607 and target base station 605.

In action 673, HSS 608 may perform UE profile update due to the handover procedure.

In action 674, USIM2 of UE 602 may determine whether to initiate at least one of handover, cell reselection, and system update with the at least one candidate target base station (e.g., target base station 603) for USIM2 of UE 602 based on the information related to the candidate target base stations associated with USIM2 received in the handover command in action 667.

If UE 602 determines to initiate a handover with target base station 603, the process may proceed to action 675.

In action 675, USIM2 of UE 602 may send a cell access request to access target base station (e.g., eNB) 603. In the present implementation, the cell access request may be at least one of RAU, TAU, and LAU requests.

In action 676, target bases station 603 may forward the cell access request to System 2.

In action 677, System 2 may forward the cell access request to HSS 608. HSS 608 may acknowledge and respond to the cell access request by sending an HSS LAU response or an HSS RAU response to USIM2 of UE 602 via System 2 and target bases station 603.

In action 678, System 2 may release the old UE context in the source base station (not shown) of System 2.

Figure 7:
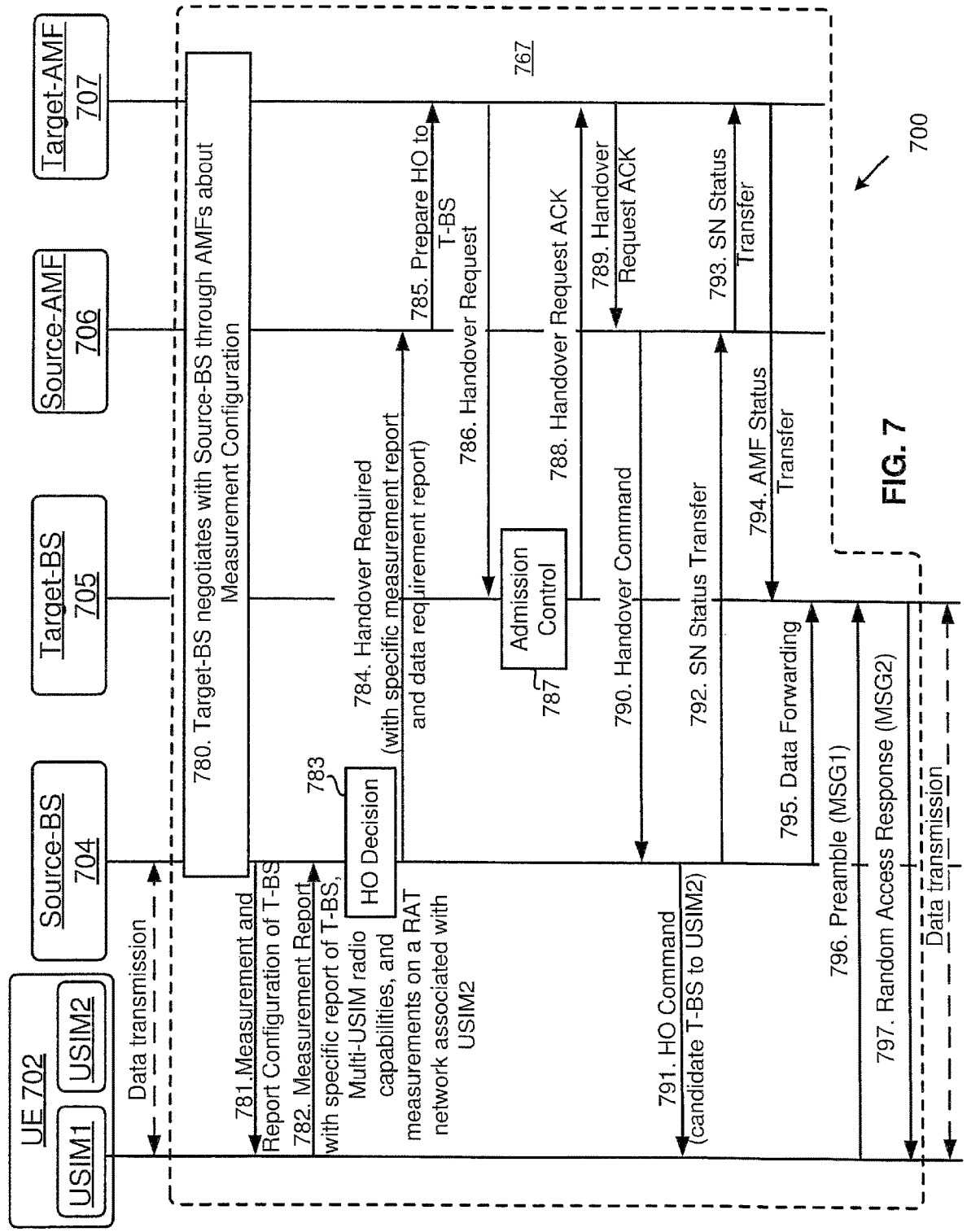
FIG. 7 is a signaling sequence diagram for schematically illustrating a method of performing a handover procedure from a source base station to a target base station associated with a first USIM of a multi-USIM UE, in accordance with example implementations of the present disclosure.

FIG. 7 is a signaling sequence diagram for schematically illustrating a method of performing a handover procedure from a source base station to a target base station associated with a first USIM of a multi-USIM UE, in accordance with example implementations of the present disclosure.

In diagram 700, a handover procedure in a wireless communication network may be performed for a first system (e.g., System 1). System 1 may include different Radio Access Technologies (e.g., 5G, LTE, edge, etc.). In the present implementation, the wireless communication network may include multi-USIM UE 702 (e.g., having USIM1 and USIM2), source base station (source-BS) 704, target base station (target-BS) 705, source-AMF 706, and target-AMF 707. In the present implementation, USIM1 and USIM2 of UE 702 may belong to the same or different PLMNs. In the present implementation, target-BS 705 associated with USIM1 of UE 702 may support one or more of the following Radio Access Technologies: CDMA, GERAN, UTRA, E-UTRA, and NR.

In diagram 700, handover procedure 767 may include actions 780, 781, 782, 783, 784, 785, 786, 787, 788, 789, 790, 791, 792, 793, 794, 795, 796, and 797. In one implementation, handover procedure 767 may correspond to handover procedure 667 in FIG. 6. In one implementation, multi-USIM UE 702, source-BS 704, target-BS 705, source-AMF 706, and target-AMF 707 described in diagram 700 of FIG. 7 may correspond to multi-USIM UE 602, source base station 604, target base station 605, source AMF 606, and target AMF 607, respectively, in FIG. 6. Before the handover procedure, UE 702 may be in data transmission with source-BS 704 as indicated in FIG. 7. Such data transmission may correspond to action 662 in FIG. 6.

In action 780, target-BS 705 may negotiate with source-BS 704 through source-AMF 706 and target-AMF 707 about a measurement and report configuration (e.g., synchronization signal (SS) configuration, channel state information-resource index (CSI-RS) configuration, or other RS(s)

for radio resource management (RRM)) including a specific report regarding target-BS 705.

In action 781, source-BS 704 may provide the measurement and report configuration of target-BS 705 to USIM1 of UE 702. In one implementation, source-BS 704 may provide details regarding target-BS 705 to UE 702, for example, details regarding how to measure reference signal received power (RSRP) of source-BS 704's neighboring cells, including cells covered by target-BS 705. The information appended in the measurement and report configurations may include measurement frequency, period and reference signal configuration. In the present implementation, the measurement configuration may include an information element (IE), which enables UE 702 to take measurements and provide a measurement report of target-BS 705 in action 782.

In action 782, USIM1 of UE 702 may provide a measurement report to source-BS 704. The measurement report may include a specific report regarding target-BS 705 and the multi-USIM radio capabilities of the UE 702. The measurement report may also include measurements on a RAT network associated with USIM2 of UE 702.

In the present implementation, USIM2 of UE 702 may provide the measurements on a RAT network associated with USIM2 of UE 702 to USIM1 of UE 702. In the present implementation, according to the report configuration in action 780, when the measured RSRP of target-BS 705 becomes higher than a predetermined threshold, UE 702 may take measurements of the reference signal (e.g., specified in the measurement and report configuration in action 780) from target-BS 705 based on the measurement configuration. USIM 1 of UE 702 may then provide a measurement report of target-BS 705 in the measurement report to source-BS 704. In the present implementation, the measurement report of target-BS 705 may include details about the measured RSRP value(s) toward the specific reference signaling and other measurement information, such as the SS block index, CSI-RS resource index (CRI), and system frame number (SFN).

In action 783, after receiving the measurement report from UE 702, source-BS 704 may make a handover decision on whether to handover UE 702 based on, for example, the measurement report and RRM information.

In action 784, if source-BS 704 decides to handover UE 702 to target-BS 705, source-BS 704 may send a handover required message to source-AMF 706, to provide the necessary information that allow source-AMF 706 and target-BS 705 to prepare for the handover. In the present implementation, the handover required message may be the measurement report about target-BS 705 and a data requirement report.

In action 785, source-AMF 706 may send the handover request message to target-AMF 707 to provide the necessary information to allow target-BS 705 to prepare for the handover. In the present implementation, the handover request message may contain UE 702's identity, source-BS's 704 identity, and the data requirement report of UE 702. The data requirement report may contain information such as data rate or data volume requirements for UE 702.

In action 786, target-AMF 707 may send the handover request message to target-BS 705.

In action 787, target-BS 705 may perform admission control to configure the required resources for the handover. For example, target-BS 705 may configure dedicated physical random access channel (PRACH) and/or random access channel (RACH) resources for contention free random access (CFRA) according to the handover request message.

In action 788, target-BS 705 may send a handover request acknowledgement (ACK) message to target-AMF 707.

In action 789, target-AMF 707 may send the handover request ACK message to source-AMF 706

In action 790, source-AMF 706 may send a handover command to source-BS 704.

In action 791, source-BS 704 may send the handover command to USIM1 of UE 702. In the present implementation, the handover command may include information of target-BS 705 associated with USIM1 of UE 702, and information of at least one candidate target base station (e.g., a list of target cells, received signal strength indicator (RSSI) levels for handover, etc.) associated with USIM2 of UE 702.

In action 792, source-BS 704 may send an SN status transfer message to source-AMF 706.

In action 793, source-AMF 706 may send the SN status transfer message to target-AMF 707.

In action 794, target-AMF 707 may send an AMF status transfer message to target-BS 705.

In action 795, source-BS 704 may forward data for the data communication with USIM1 to target-BS 705.

In action 796, USIM1 may send a random access preamble (e.g., MSG1) to target-BS 705 in the RACH resource and/or PRACH resource.

In action 797, target-BS 705 may send a random access response (e.g., MSG2) to UE 702. As a result, USIM1 of UE 702 may be synchronized with target-BS 705. The random access response may also include resources assigned for data transmission between USIM1 of UE 702 and target-BS 705. In some implementations, target-BS 705 may transmit a Physical Downlink Shared Channel (PDSCH) for the random access response to UE 702

After handover procedure 767 is performed, for example, after action 797, UE 702 may be in a data transmission mode with target-BS 705 as indicated in FIG. 7. Such data transmission may correspond to action 670 in FIG. 6.

Figure 8:
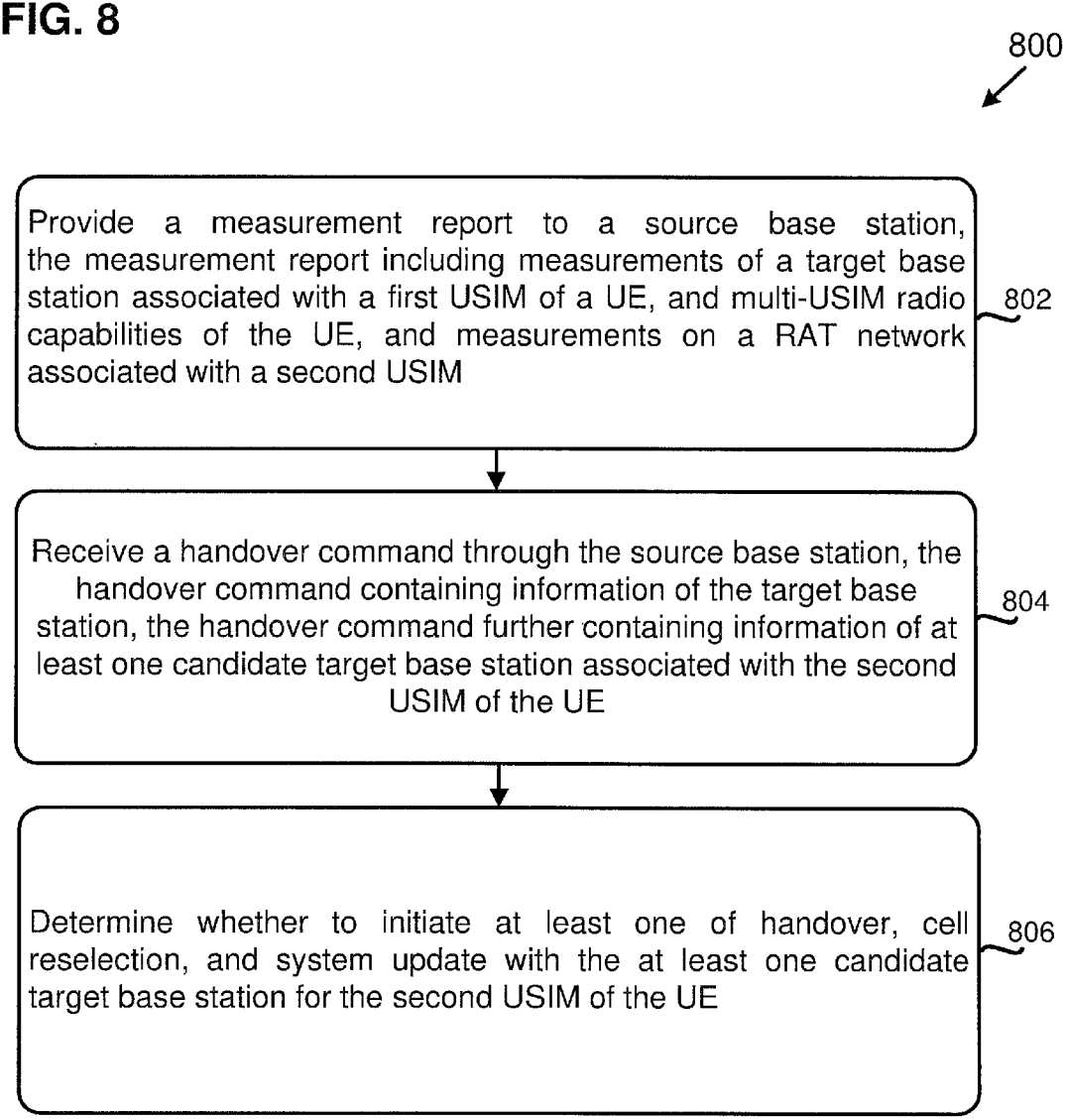
FIG. 8 is a flowchart diagram illustrating a method of a multi-USIM UE performing a handover procedure for a first system associated with a first USIM of a multi-USIM UE and a second system associated with a second USIM of the multi-USIM UE, in accordance with example implementations of the present disclosure.

FIG. 8 is a flowchart diagram illustrating a method of a multi-USIM UE performing a handover procedure for a first system associated with a first USIM of a multi-USIM UE and a second system associated with a second USIM of the multi-USIM UE, in accordance with example implementations of the present disclosure.

As illustrated in FIG. 8, flowchart 800 may include actions 802, 804, and 806. In one implementation, a wireless communication network may include a multi-USIM supporting UE, a source base station, a target base station, a source AMF, a target AMF, a candidate target base station, and an HSS. In the present implementation, the multi-USIM supporting UE may correspond to UE 602 in FIG. 6 or UE 702 in FIG. 7. The source base station may correspond to source base station 604 in FIG. 6 or source-BS 704 in FIG. 7. The target base station may correspond to target base station 605 in FIG. 6 or target-BS 705 in FIG. 7. The source AMF may correspond to source AMF 606 in FIG. 6 or source-AMF 706 in FIG. 7. The target AMF may correspond to target AMF 607 in FIG. 6 or target-AMF 707 in FIG. 7. The candidate target base station may correspond to target base station 603 in FIG. 6. The HSS may correspond HSS 608 in FIG. 6.

In action 802, a UE may include one or more non-transitory computer-readable media having computer-executable instructions and at least one processor configured to execute the computer-executable instructions which provide a measurement report to a source base station. The measurement report may include measurements of a target base station associated with a first USIM of the UE, multi-USIM radio capabilities of the UE, and measurements on a RAT network associated with a second USIM. In the present implementation, the measurements on the RAT network associated with the second USIM may be provided by the second USIM to the first USIM of the UE. For example, with reference to FIG. 7, UE 702 may provide a measurement report regarding target-BS 705 to source-BS 704, multi-USIM radio capabilities of UE 702, and measurements on a RAT network associated with USIM2 of UE 702. The measurement report may include measurements of target-BS 705 associated with USIM1 of the UE 702.

In action 804, the UE may be configured to receive a handover command through the source base station. The handover command may contain information of the target base station. The handover command may further contain information of at least one candidate target base station associated with a second USIM of the UE. For example, with reference to FIGS. 6 and 7, after UE 702 provides the measurement report regarding target-BS 705, multi-USIM radio capabilities of UE 702, and measurements on the RAT network associated with USIM2 of UE 702 to source-BS 704, UE 702 may receive a handover command through source-BS 704. The handover command may contain information of target-BS 705 and information of at least one candidate target base station (e.g., target base station 603) associated with USIM2 of the UE 702. After UE 702 receives the handover command, UE 702 may synchronize and begin data transmission with target-BS 705 associated with USIM1 of UE 702.

In action 806, the UE may be configured to determine whether to initiate at least one of handover, cell reselection, and system update with the at least one candidate target base station for the second USIM of the UE. For example, with reference to FIGS. 6 and 7, after UE 702 or the corresponding UE 602 begin data transmission with target base station 605 associated with USIM1 of UE 602 as shown in actions 670, 671, and 672 of FIG. 6, UE 602 may further determine to initiate or trigger at least one of handover, cell reselection, and system update with one of the candidate target base stations (e.g., target base station 603) associated with USIM2 of UE 602 as shown in FIG. 6.

It should be noted that the handover procedure for USIM2 is substantially similar to the handover procedure for USIM1, the details of which are omitted for brevity.

Figure 9:
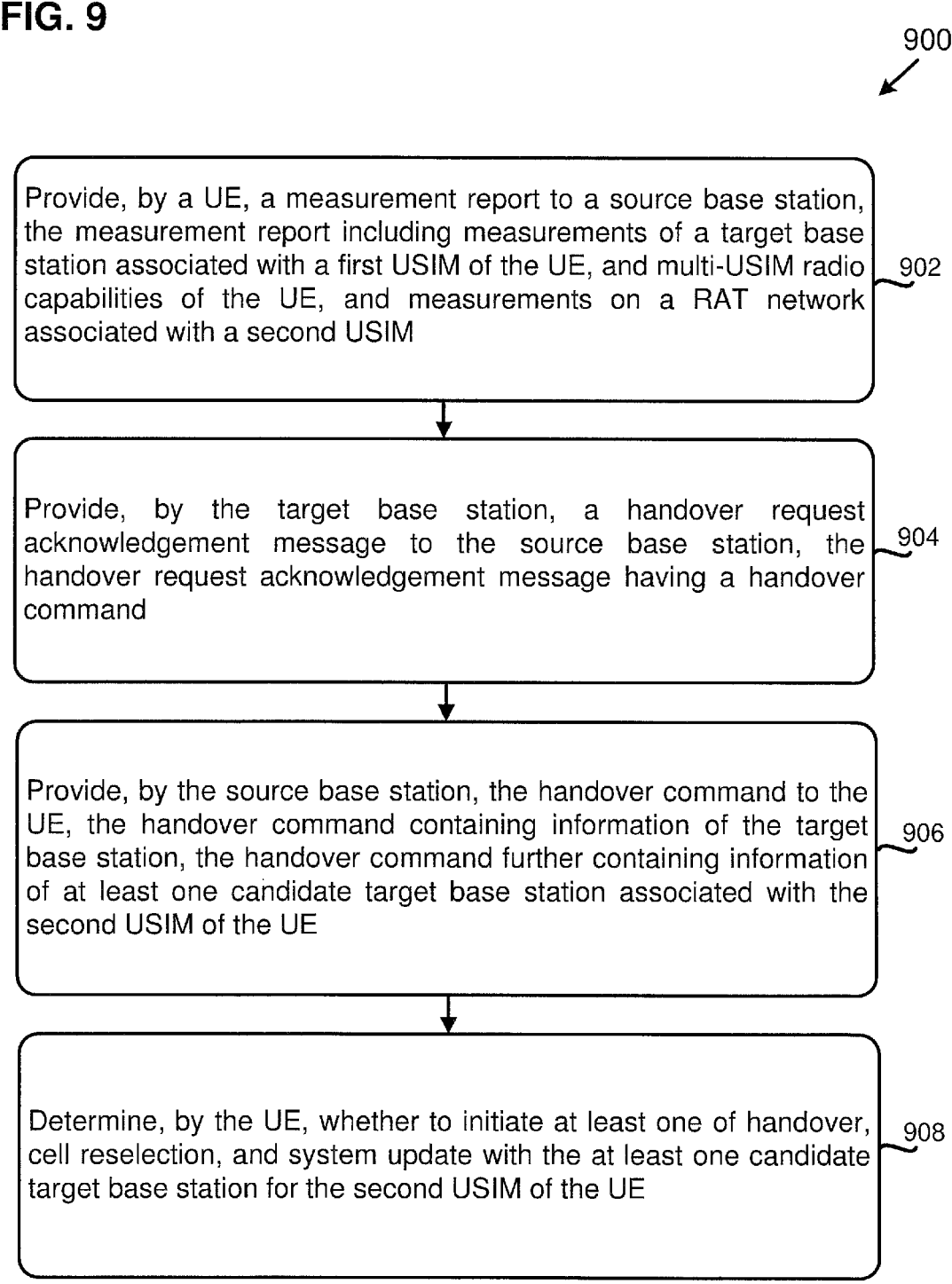
FIG. 9 is a flowchart diagram illustrating a method of a network performing a handover procedure for a first system associated with a first USIM of a multi-USIM UE and a second system associated with a second USIM of the multi-USIM UE, in accordance with example implementations of the present disclosure.

FIG. 9 is a flowchart diagram illustrating a method of a network performing a handover procedure for a first system associated with a first USIM of a multi-USIM UE and a second system associated with a second USIM of the multi-USIM UE, in accordance with example implementations of the present disclosure.

As illustrated in FIG. 9, flowchart 900 may include actions 902, 904, 906, and 908. In the present implementation, a wireless communication network may include a multi-USIM supporting UE, a source base station, a target base station, a source AMF, a target AMF, a candidate target base station, and an HSS that correspond to the network equipment in FIGS. 6 and 7 as aforementioned, thus, description of the network equipment are omitted for brevity.

In the present implementation, action 902 may be substantially similar to action 802 in FIG. 8. The detailed descriptions of action 902 are omitted for brevity.

In action 904, the target base station may be configured to provide a handover request acknowledgement message to the source base station, the handover request acknowledgement message having a handover command. For example, with reference to FIGS. 6 and 7, after UE 702 provides the measurement report regarding target-BS 705, multi-USIM radio capabilities of UE 702, and measurements on the RAT network associated with USIM2 of UE 702 to source-BS 704, target-BS 705 may be configured to provide a handover request acknowledgement (ACK) message to source-BS 704 through actions 788-790 in handover procedure 767 of FIG. 7.

In action 906, the source base station may be configured to provide the handover command to the UE, the handover command containing information of the target base station, the handover command further containing information of at least one candidate target base station associated with the second USIM of the UE. For example, with reference to FIG. 7, source-BS 704 may be configured to provide a handover command to USIM1 of UE 702 in handover procedure 767 of FIG. 7. The handover command may contain information of target-BS 705 and information of at least one candidate target base station (e.g., target base station 603) associated with USIM2 of the UE 702. After UE 702 receives the handover command, UE 702 may synchronize with and begin data transmission with target-BS 705 associated with USIM1 of UE 702.

In the present implementation, action 908 may be substantially similar to action 806 in FIG. 8. The detailed descriptions of action 908 are omitted for brevity.

The example implementations of the present application allow the network to indicate its capabilities and support for multi-USIM based operations. As the network providing UEs under its coverage with the indication on whether the network is capable of multi-USIM based operations, the signaling overhead, that would have otherwise incurred due as a result of UEs attempting to update their multi-USIM capabilities with the network, can be effectively avoided. In addition, the example implementations of the present application allow a handover procedure for a first system associated with a first USIM of a multi-USIM UE and/or a second system associated with a second USIM of the multi-USIM UE, where the first USIM and the second USIM of the multi-USIM UE may belong to a different or the same PLMN.

In one example, a user equipment (UE) for wireless communication, the UE comprising: one or more non-transitory computer-readable media having computer-executable instructions embodied thereon; at least one processor coupled to the one or more non-transitory computer-readable media, and configured to execute the computer-executable instructions to: provide a measurement report to a source base station, the measurement report including measurements of a target base station associated with a first universal subscriber identity module (USIM) of the UE; receive a handover command through the source base station, the handover command containing information of the target base station, the handover command further containing information of at least one candidate target base station associated with a second USIM of the UE.

In one example, the UE, wherein the at least one processor is further configured to execute the computer-executable instructions to: determine whether to initiate at least one of handover, cell reselection, and system update with the at least one candidate target base station for the second USIM of the UE.

In one example, the UE, wherein the first USIM belongs to a first Public Land Mobile Network (PLMN), and the second USIM belongs to a second PLMN.

In one example, the UE, wherein the first USIM and the second USIM belong to a same PLMN.

In one example, the UE, wherein the measurement report further includes an indication of multi-USIM radio capabilities of the UE and measurements on a second radio access technology (RAT) network associated with the second USIM.

In one example, the UE, wherein the measurements on the second RAT network associated with the second USIM are provided from second USIM based circuitry to first USIM based circuitry for inclusion in the measurement report to the source base station.

In one example, the UE, wherein: the handover command is received through first USIM based circuitry; the handover command triggers a handover indication from the first USIM based circuitry to second USIM based circuitry to inform the second USIM of impending mobility; the handover indication from the first USIM to the second USIM includes additional information regarding the at least one candidate target base station associated with the second USIM of the UE.

In one example, the UE, wherein the additional information regarding the at least one candidate target base station associated with the second USIM of the UE includes at least one of a list target cells and threshold information.

In one example, the UE, wherein the target base station associated with the first USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

In one example, the UE, wherein the at least one candidate target base station associated with the second USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

In one example, a method of a user equipment (UE), the method comprising providing a measurement report to a source base station, the measurement report including measurements of a target base station associated with a first universal subscriber identity module (USIM) of the UE; receiving a handover command through the source base station, the handover command containing information of the target base station, the handover command further containing information of at least one candidate target base station associated with a second USIM of the UE.

In one example, the method, further comprising: determining whether to initiate at least one of handover, cell reselection, and system update with the at least one candidate target base station for the second USIM of the UE.

In one example, the method, wherein the first USIM belongs to a first Public Land Mobile Network (PLMN), and the second USIM belongs to a second PLMN.

In one example, the method, wherein the first USIM and the second USIM belong to a same PLMN.

In one example, the method, wherein the measurement report further includes an indication of multi-USIM radio capabilities of the UE and measurements on a second radio access technology (RAT) network associated with the second USIM.

In one example, the method, wherein the measurements on the second RAT network associated with the second USIM are provided from second USIM based circuitry to first USIM based circuitry for inclusion in the measurement report to the source base station.

In one example, the method, wherein: the handover command is received through first USIM based circuitry; the handover command triggers a handover indication from the first USIM based circuitry to second USIM based circuitry to inform the second USIM of impending mobility; the handover indication from the first USIM to the second USIM includes additional information regarding the at least one candidate target base station associated with the second USIM of the UE.

In one example, the method, wherein the additional information regarding the at least one candidate target base station associated with the second USIM of the UE includes at least one of a list target cells and threshold information.

In one example, the method, wherein the target base station associated with the first USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

In one example, the method, wherein the at least one candidate target base station associated with the second USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

In one example, a method for performing handover of a user equipment (UE) from a source base station to a target base station, the method comprising: providing, by the UE, a measurement report to the source base station, the measurement report including measurements of the target base station; providing, by the source base station, a handover request message to the target base station; providing, by the target base station, a handover request acknowledgement message to the source base station, the handover request acknowledgement message having a handover command; providing, by the source base station, the handover command to the UE; wherein the handover command contains information of the target base station associated with a first universal subscriber identity module (USIM) of the UE, and information of at least one candidate target base station associated with a second USIM of the UE.

In one example, the method, further comprising: determining, by the UE, whether to initiate at least one of handover, cell reselection and system update with the at least one candidate target base station for the second USIM of the UE.

In one example, the method, wherein the first USIM belongs to a first Public Land Mobile Network (PLMN), and the second USIM belongs to a second PLMN.

In one example, the method, wherein the first USIM and the second USIM belong to a same PLMN.

In one example, the method, wherein the measurement report further includes an indication of multi-USIM radio capabilities of the UE and measurements on a second radio access technology (RAT) network associated with the second USIM.

In one example, the method, wherein the measurements on the second RAT network associated with the second USIM are provided from second USIM based circuitry to first USIM based circuitry for inclusion in the measurement report to the source base station.

In one example, the method, wherein: the handover command is received through first USIM based circuitry; the handover command triggers a handover indication from the first USIM based circuitry to second USIM based circuitry to inform the second USIM of impending mobility; the handover indication from the first USIM to the second USIM includes additional information regarding the at least one candidate target base station associated with the second USIM of the UE.

In one example, the method, wherein the additional information regarding the at least one candidate target base station associated with the second USIM of the UE includes at least one of a list target cells and threshold information.

In one example, the method, wherein the target base station associated with the first USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

In one example, the method, wherein the at least one candidate target base station associated with the second USIM of the UE supports one or more of the following RATs: Code-Division Multiple Access (CDMA) 2000; GSM EDGE Radio Access Network (GERAN); Universal Terrestrial Radio Access (UTRA); Evolved-Universal Terrestrial Radio Access (E-UTRA); and New Radio (NR).

CROSS REFERENCE

This Nonprovisional application claims priority under 35 U.S.C. § 119 on provisional Application No. 62,909,616 on Oct. 2, 2019, the entire contents of which are hereby incorporated by reference.

What is claimed is:

1. A user equipment (UE) for wireless communication, the UE comprising:
   one or more non-transitory computer-readable media having computer-executable instructions embodied thereon;
   at least one processor coupled to the one or more non-transitory computer-readable media, and configured to execute the computer-executable instructions to:
   provide a measurement report to a source base station, the measurement report including measurements of a target base station associated with a first universal subscriber identity module (USIM) of the UE;
   receive a handover command through the source base station, the handover command containing information of the target base station, the handover command further containing information of at least one candidate target base station associated with a second USIM of the UE.

2. The UE of claim 1, wherein the at least one processor is further configured to execute the computer-executable instructions to:
   determine whether to initiate at least one of handover, cell reselection, and system update with the at least one candidate target base station for the second USIM of the UE.

3. The UE of claim 1, wherein the first USIM belongs to a first Public Land Mobile Network (PLMN), and the second USIM belongs to a second PLMN.

4. The UE of claim 1, wherein the first USIM and the second USIM belong to a same PLMN.

5. The UE of claim 1, wherein the measurement report further includes an indication of multi-USIM radio capabilities of the UE and measurements on a second radio access technology (RAT) network associated with the second USIM.

6. The UE of claim 1, wherein:
   the handover command is received through first USIM based circuitry;
   the handover command triggers a handover indication from the first USIM based circuitry to second USIM based circuitry to inform the second USIM of impending mobility;
   the handover indication from the first USIM to the second USIM includes additional information regarding the at least one candidate target base station associated with the second USIM of the UE.

7. A method of a user equipment (UE), the method comprising
   providing a measurement report to a source base station, the measurement report including measurements of a target base station associated with a first universal subscriber identity module (USIM) of the UE;
   receiving a handover command through the source base station, the handover command containing information of the target base station, the handover command further containing information of at least one candidate target base station associated with a second USIM of the UE.

8. A method for performing handover of a user equipment (UE) from a source base station to a target base station, the method comprising:
   providing, by the UE, a measurement report to the source base station, the measurement report including measurements of the target base station;
   providing, by the source base station, a handover request message to the target base station;
   providing, by the target base station, a handover request acknowledgement message to the source base station, the handover request acknowledgement message having a handover command;
   providing, by the source base station, the handover command to the UE;
   wherein the handover command contains information of the target base station associated with a first universal subscriber identity module (USIM) of the UE, and information of at least one candidate target base station associated with a second USIM of the UE.

* * * * *